United States Patent Office 3,171,866
Patented Mar. 2, 1965

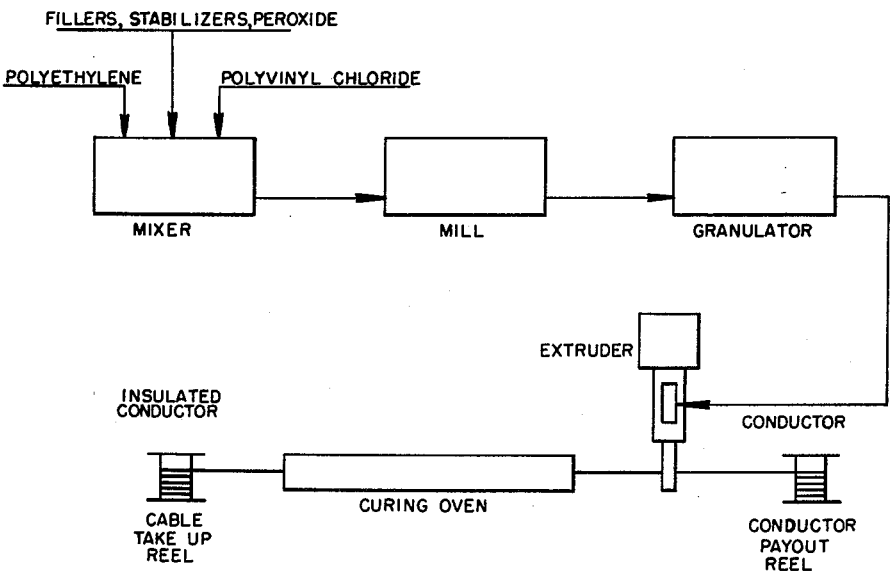

3,171,866
PEROXIDE CURED POLYETHYLENE WITH POLYVINYL CHLORIDE FILLER AND WIRE COATED WITH THE SAME
Vincent E. Meyer, Fairfield, and Warren O. Eastman, Derby, Conn., assignors to General Electric Company, a corporation of New York
Filed Dec. 1, 1960, Ser. No. 72,848
6 Claims. (Cl. 260—897)

This invention relates to peroxide curable compositions containing polyethylene and polyvinyl chloride and to electrical cable insulated with such compositions.

Precopio and Gilbert Patent No. 2,888,424, which is assigned to the same assignee as the present application, disclosed and claimed peroxide curable compositions which included polyethylene and a filler such as silica, carbon black, alumina, and calcium silicate. The Precopio and Gilbert patent was directed primarily to compositions having high strength and elongation rather than good electrical properties. Of the filler materials disclosed in the patent, carbon black in particular reduced the effectiveness of the composition as electrical insulation and the other filler materials of Precopio and Gilbert were not desirable from the standpoint of optimum electrical characteristics. In addition, these compositions had poor flame resistance properties.

One of the objects of the present invention is to provide a peroxide curable composition having optimum electrical properties.

Another object of the present invention is to provide a peroxide curable composition possessing a high degree of flame resistance.

Another object of the present invention is to provide a peroxide curable polyethylene composition which is modified by the presence of polyvinyl chloride.

Other objects of the invention will become apparent from the following specification considered in conjunction with the annexed drawing illustrating schematically the practice of this invention.

Briefly stated, in accordance with one of its aspects, the invention is directed to a curable composition comprising polyethylene and polyvinyl chloride filler together with a peroxide in which there is at least one unit of the structure

```
      C     C
      |     |
  C—C—O—O—C—C
      |     |
      C     C
``` the decomposition temperature of which is in excess of 130° C.

Among the tertiary peroxides having at least one unit of the structure shown above are those having the formula R—O—O—R′ where R and R′ (which may or may not be similar) are radicals selected from the group consisting of

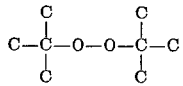

and

These peroxides may be described as peroxides in which each of the peroxide oxygens is linked directly to a tertiary carbon atom whose remaining valences are attached to radicals selected from the group consisting of $R_1$, $R_2$, $R_3$, $R_4$, $R_5$ and $R_6$. $R_1$, $R_2$, $R_3$, and $R_4$ comprise alkyl radicals such as methyl, ethyl, propyl, butyl, pentyl, hexyl, heptyl, octyl, nonyl, decyl, undecyl, octadecyl, etc. and isomers thereof; cycloalkyl radicals such as cyclopropyl, cyclobutyl, cyclopentyl, cyclohexyl, cycloheptyl, cyclooctyl, etc.; alkylcycloalkyl radicals such as methylcyclobutyl, ethylcyclopenty, tert-butyl-methylcyclohexyl, isopropylcyclohexyl, etc.; cycloalkyl-alkyl radicals such as cyclopropylmethyl, cyclopentylethyl, cyclohexylpropyl, etc.; aryl radicals such as phenyl, biphenyl, naphthyl, anthracyl, tolyl, xylyl, ethylphenyl, tert-butylphenyl, propylbiphenyl, ethylnaphthyl, tert-butylnaphthyl, propylnaphthyl, etc.; aralkyl radicals such as benzyl, phenylethyl, naphthylpropyl, etc. The unit

is a radical wherein the tertiary carbon attached to the peroxide oxygen is contained within a hydrocarbon cyclic radical structure such as cyclopropyl, cyclobutyl, cyclopentyl, cyclohexyl, cycloheptyl, etc., an example of which is di-phenylcyclohexyl peroxide,

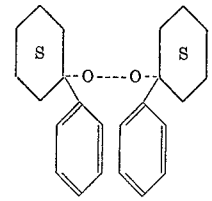

Mixtures of these peroxides may also be used.

In addition, these peroxides may contain inorganic groups, such as halogens, nitro groups, etc., for example, chlorophenyl, bromophenyl, nitrophenyl, etc.

The peroxides disclosed herein can be prepared by any of the methods known to the art. For example, di-α-cumyl peroxide,

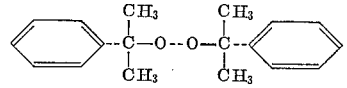

(sold by Hercules Powder Co., of Wilmington, Delaware), can be prepared by the method described by Kharasch et al. in the Journal of Organic Chemistry 15, pages 756–762 (1950), tert-butyl-α-cumyl peroxide,

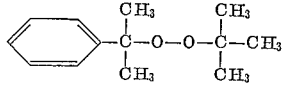

by the method of Kharasch et al. in the Journal of Organic Chemistry 15, pages 775–781 (1950), etc.

Examples of diperoxides which are usable in the present invention are

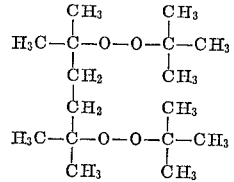

and

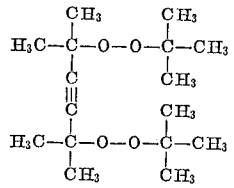

The polyethylene referred to herein is a polymeric material formed by the polymerization of ethylene. It is described in Patent No. 2,153,553—Fawcett et al., and in Modern Plastics Encyclopedia, New York, 1949, pages 268–271. Specific examples of commercially available polyethylene are the polyethylene sold by E. I. du Pont de Nemours & Co., Inc., Wilmington, Delaware, examples of which are "Alathons 1, 3, 10, 12, 14, etc.," those sold by the Bakelite Company, such as "DE–2400, DYNH, DND–8500, DFD–2005, etc.," and the Phillips Petroleum Company polymers, such as "Marlex 20, 50, etc." Other polyethylenes of various molecular weights are described by Lawton et al. in Industrial and Engineering Chemistry 46, pages 1703–1709 (1954).

The polyvinyl chloride referred to herein is a polymeric material formed by the polymerization of vinyl chloride. It is desirable that the polyvinyl chloride used be very finely divided, e.g., average particle size diameter less than 2 microns, the suspension polymerized polymer being preferable to the emulsion polymerized. An example of a satisfactory emulsion polymerized polymer is Geon 121 manufactured by the B. F. Goodrich Company. A satisfactory suspension polymer is Pliovic VO manufactured by the Goodyear Company. Preparation of the latter preferred material is described in Lintala Patent No. 2,890,211. While the required ingredients of the present compositions are polyethylene, polyvinyl chloride, and a tertiary peroxide having at least one unit of the structure

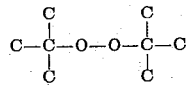

which substantially decomposes only at temperatures in excess of 130° C., it is to be understood that other materials may be present including materials copolymerized with polyethylene. Accordingly, the following examples are illustrative rather than limiting.

Example 1

A compound containing low density polyethylene (Bakelite DFD–2005)—100 parts, emulsion polymerized polyvinyl chloride (Geon 121)—45 parts, antimony oxide—40 parts, complex lead chlorosilicate (Lectro 60)—15 parts, polymerized trimethyldihydroquinoline (AgeRite Resin D)—1.5 parts, and 2,5-dimethyl-2,5-di(t-butylperoxy) hexane (Varox)—10 parts (50% active) was mixed in a Werner-Pflederer intensive mixer at 120° C., sheeted out on a mill at 105° C., granulated and extruded on a #14 AWG solid copper conductor in a continuous vulcanization machine. The wire was run at a linear speed of 100 ft. per minute and cured at a steam pressure of 200 p.s.i.g. in an 80-foot curing pipe. The resultant wire exhibited a tensile strength of 1938 p.s.i. and an elongation of 275% in an unaged condition. After aging for three days at 165° C., the tensile strength rose to 2215 p.s.i. while the elongation dropped to 140%. When immersed in water for one day at 75° C., the insulation resistance was 1732 megohms per 1,000 feet and the power factor was 1.6%. This cable was self-extinguishing when held vertically and a flame from a Bunsen burner applied.

Example 2

A compound containing 44 parts of polyethylene (40 parts DFD–2005 and 4 parts DND–8500), 20 parts of polyvinyl chloride (Pliovic VO), 13.5 parts of antimony oxide, 5 parts of basic lead silicate, 13 parts of hydrated alumina, 0.5 parts of polymerized trimethyldihydroquinoline, 1 part of di-α-cumyl peroxide, and 1 part of 2,5-dimethyl-2,5-di(t-butylperoxy) hexane was mixed on a 2-roll mill at 115° C., preformed into a slab at 120° C. and cured in open steam for two minutes at 200 p.s.i. gauge. The cured slab had a tensile strength of 1570 p.s.i. and an elongation of 200%. The electrical insulation properties were excellent.

Example 3

A compound containing 100 parts of polyethylene (DFD–2005), 45 parts of polyvinyl chloride (Pliovic VO), 30.7 parts of antimony oxide, 11.4 parts of basic lead silicate, 29.6 parts of aluminum silicate containing ½% of aluminum oleate and having a pH of 7.4, 1.14 parts of polymerized trimethyldihydroquinoline, and 3.6 parts of di-α-cumyl peroxide was mixed on a 2-roll mill at 115° C., preformed at 120° C. in a press at 500 p.s.i. and cured for one minute in open steam at 250 p.s.i. gauge. The cured slab had a tensile strength of 1560 p.s.i. and an elongation of 200%. Flame resistant properties and electrical properties were excellent.

Example 4

A compound containing 100 parts of an ethylenebutene copolymer (Alathon 970033), 45 parts of polyvinyl chloride (Pliovic VO), 30.7 parts of antimony oxide, 11.4 parts of basic lead silicate, 29.6 parts of hydrated aluminum silicate which had been calcined containing ½% of aluminum oleate and having a pH of 7.4, 1.14 parts of polymerized trimethyldihydroquinoline, and 3.6 parts of di-α-cumyl peroxide was mixed in a Werner-Pflederer intensive mixer at 110°–115° C., sheeted out on a 2-roll mill, granulated and extruded in a continuous vulcanizing tuber on a #20 AWG tinned copper wire at a linear speed of 100 feet per minute. The steam in the curing pipe was maintained at 220 p.s.i. during this extrusion, thus effecting a complete cure of the insulation. The resultant cured wire insulation exhibited a tensile strength of 2300 p.s.i. and an elongation of 230%. This wire was self-extinguishing when held at a 45° angle and subjected to a Bunsen burner flame for 30 seconds.

Example 5

A compound containing 100 parts of polyethylene (DFD–2005), 45 parts of polyvinyl chloride (Geon 121), 15 parts of lead chlorosilicate complex, 1.5 parts of polymerized trimethyldihydroquinoline, 5 parts of antimony oxide, and 4 parts of di-α-cumyl peroxide was mixed in a Werner-Pflederer intensive mixer, sheeted on a 2-roll mill and extruded on #14 solid AWG wire in a continuous vulcanizing machine. The resultant insulation which was cured at 240 p.s.i.g. with a wire speed of 100 feet per minute had a tensile strength of 2006 p.s.i. and an elongation of 350% and a power factor of 3.32. It was self-extinguishing when placed in a Bunsen flame.

Example 6

A compound containing 100 parts of polyethylene (DFD–2005), 100 parts of polyvinyl chloride (Geon 121), 20 parts of basic lead silicate, and 5 parts of 2,5-dimethyl-2,5-di(t-butylperoxy) hexane (Varox) was mixed on a 2-roll mill at 115° C. and subsequently cured in a press for 25 minutes at 325° F. and 500 p.s.i. pressure. The resultant cured panel had a tensile strength of 2640 p.s.i. and an elongation of 95%. While the elongation was lower than desirable, the electrical and flame-resistant properties of the compound were excellent.

Example 7

A compound containing 100 parts of an ethylene-propylene copolymer containing 10–18 mol percent of propylene (EPP–2—Hercules Powder Co.), 40 parts of polyvinyl chloride (Pliovic VO), 20 parts of basic lead silicate, 20 parts of finely divided talc, and 1.5 parts of di-α-cumyl peroxide was mixed on a 2-roll mill at 80° C. and subsequently press-cured for 20 minutes at 325° F. and 500 p.s.i. The resultant panel had a tensile strength of 980 p.s.i. and elongation of 460%. While the tensile strength was somewhat lower than optimum, the compound had excellent flame resistant and electrical properties.

Suspension polymerized polyvinyl chloride is preferred to emulsion polymerized as it appears to mix better with polyethylene. Polyvinyl chloride which does not mix thoroughly has a tendency to decompose during curing as evidenced by black specks in the insulation after curing. This tendency can be overcome in part by using conventional stabilizers for polyvinyl chloride compounds such as basic lead silicate and lead chlorosilicate complex as set forth in the above examples. Judicious mixing of the compound so that the polyvinyl chloride is completely coated with polyethylene reduces the tendency of the polyvinyl chloride toward decomposition.

The usual proportions of polyvinyl chloride are from 5% by weight of the polyethylene present up to equal parts of polyethylene and polyvinyl chloride. An optimum range is 40 to 50 parts by weight of polyvinyl chloride per hundred parts by weight of polyethylene. This range produces effective flame resistance. Polyethylene may be blended with other polymers and this will reduce the proportion of polyvinyl chloride present in the total mixture. The uncured polymeric compositions which may be blended with the polyvinyl chloride-polyethylene compositions and cured to polymers of enhanced properties comprise organopolysiloxanes having a carbon to silicon linkage, such as those disclosed and claimed in Agens Patent No. 2,448,756; Sprung Patents Nos. 2,448,556 and 2,484,595; Krieble et al. Patent No. 2,457,688; Hyde Patent No. 2,490,357; Marsden Patent No. 2,521,528; Warrick Patent No. 2,541,137, etc.; copolymers of butadiene and styrene (where the butadiene, e.g., butadiene-1,3, may comprise from 20% to 80% of the total weight of the butadiene and styrene), an example of which is GR–S rubber; polymeric chloroprene or 2-chlorobutadiene, an example of which is neoprene; polymers of monohydric alcohol esters of acrylic acid, e.g., polymeric methyl acrylate, polymeric butyl acrylate, such polymeric materials ranging from tough, pliable rubber-like substances in the case of the polymeric methyl acrylate to softer and more elastic products in the case of the polymeric, longer chain alkyl acrylates (examples of polymeric alkyl acrylates which may be employed are more particularly described in Semegen Patents Nos. 2,411,899; 2,412,475; and 2,412,476) and are sold under the name of, for instance, Polyacrylic Ester EV; polystyrene (either liquid or solid); chlorosulfonated polyethylenes, such as Hypalon S–2 (du Pont) etc., and natural rubbers, e.g., smoke sheet and natural crepe, etc.

In the above examples hydrated alumina, hydrated aluminum silicate, antimony oxide, and talc were used as inert fillers which conferred desirable properties on the final product. For example, antimony oxide is well known as a flame retardant agent in the presence of chlorine and the other filler materials used are likewise of advantage.

The extrusion of the compounds of this invention onto a conductor follows the conventional practice with respect to curable insulating compositions. This is illustrated in the drawing wherein the polyethylene, polyvinyl chloride, fillers, stabilizers, and peroxide are mixed to uniformity in a mixer, heated and worked on a mill, granulated, and then introduced to an extruder where they are extruded onto a conductor, passed through a curing oven, and then wound on a takeup reel.

While the invention has been described with reference to certain specific embodiments, it will be understood that there are many variations which would fall within the true spirit of the invention. Therefore, the invention should be limited in scope only as may be necessitated by the scope of the appended claims.

What we claim as new and desire to secure by Letters Patent of the United States is:

1. A curable composition comprising polyethylene with polyvinyl chloride filler and a peroxide in which there is at least one unit of the structure

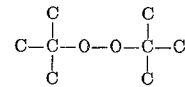

which substantially decomposes only at temperatures in excess of 130° C., the polyvinyl chloride being present to the extent of 5% to 100% by weight of the polyethylene.

2. The composition of claim 1 which has been cured by treating to a temperature above the decomposition temperature of the peroxide and below the decomposition temperature of the polyvinyl chloride.

3. A curable composition as claimed in claim 1 wherein the polyvinyl chloride is suspension polymerized.

4. A curable composition comprising (1) polyethylene and copolymers of ethylene and other polymerizable materials, (2) polyvinyl chloride to the extent of 5% to 100% by weight of the polyethylene present, and (3) a peroxide in which there is at least one unit of the structure

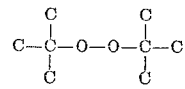

the decomposition temperature of which is in excess of 130° C.

5. The method of making electrical cable which comprises extruding the curable composition of claim 4 onto an electrical conductor, and curing said composition by passage through a curing oven which raises said composition to a temperature above the decomposition temperature of the peroxide and below the decomposition temperature of the polyvinyl chloride.

6. Electrical cable comprising a conductor, and a layer of insulation overlying said conductor, said insulation consisting of the cured product of (1) a member selected from the group consisting of polyethylene, copolymers of ethylene and other polymerizable materials, and blends of polyethylene and other polymers, (2) between 5% and 100% of polyvinyl chloride by weight of the polyethylene, and (3) a peroxide in which there is at least one unit of the structure

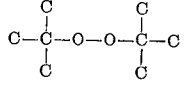

the decomposition temperature of which is in excess of 130° C.

References Cited in the file of this patent

UNITED STATES PATENTS

| | | |
|---|---|---|
| 2,888,424 | Precopio et al. | May 26, 1959 |
| 2,897,176 | Rocky et al. | July 28, 1959 |
| 2,958,672 | Goldberg | Nov. 1, 1960 |

FOREIGN PATENTS

| | | |
|---|---|---|
| 827,552 | Germany | Jan. 10, 1952 |
| 571,090 | Canada | Feb. 24, 1959 |
| 985,327 | France | July 17, 1951 |